United States Patent
Kito et al.

(10) Patent No.: US 10,093,175 B2
(45) Date of Patent: Oct. 9, 2018

(54) FUELING DEVICE

(71) Applicant: TOYODA GOSEI CO., LTD., Kiyosu-shi, Aichi-ken (JP)

(72) Inventors: Hiroaki Kito, Kiyosu (JP); Yoshinari Hiramatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/952,102

(22) Filed: Nov. 25, 2015

(65) Prior Publication Data

US 2016/0185212 A1    Jun. 30, 2016

(30) Foreign Application Priority Data

Dec. 26, 2014  (JP) .................................. 2014-263707

(51) Int. Cl.
   *B60K 15/04*  (2006.01)
(52) U.S. Cl.
   CPC ........ *B60K 15/04* (2013.01); *B60K 2015/047* (2013.01); *B60K 2015/0461* (2013.01)
(58) Field of Classification Search
   CPC ............... B60K 15/04; B60K 15/0406; B60K 2015/0429; B60K 2015/0432; B60K 2015/0458; B60K 2015/0461; B60K 2015/047

See application file for complete search history.

(56) References Cited

U.S. PATENT DOCUMENTS

| | | | | |
|---|---|---|---|---|
| 5,503,199 A | * | 4/1996 | Whitley, II | ............ B60K 15/04 141/286 |
| 5,507,324 A | * | 4/1996 | Whitley, II | ............ B60K 15/04 141/286 |

(Continued)

FOREIGN PATENT DOCUMENTS

| CN | 2374732 Y | 4/2000 |
|---|---|---|
| JP | 03-70528 U | 7/1991 |

(Continued)

OTHER PUBLICATIONS

Japanese Office Action dated Sep. 26, 2017 for the corresponding JP application No. 2014-263707 (English translation attached).

(Continued)

*Primary Examiner* — Nicolas A Arnett
(74) *Attorney, Agent, or Firm* — Posz Law Group, PLC (57) ABSTRACT

A fueling device comprises a filler neck that is configured to form a fuel flow path, a cover member, and a restraint portion. An engagement projection provided as an engagement portion of the cover member is engaged with an engaged recess provided as an engaged portion of the filler neck, so that the cover member is mounted to the filler neck on an opening side of the fuel flow path. The restraint portion is configured to restrain the cover member including an engagement extension portion downstream of the engagement projection in the fuel flow path to an outer circumferential wall of the filler neck. This configuration suppresses expansion and deformation of the cover member and avoids separation of the cover member from the filler neck, while maintaining the mounting property of the cover member.

15 Claims, 10 Drawing Sheets

(56) References Cited

U.S. PATENT DOCUMENTS

| | | | | |
|---|---|---|---|---|
| 5,660,206 A * | 8/1997 | Neal | | B60K 15/04 137/512.15 |
| 6,386,244 B2 * | 5/2002 | Brown | | B60K 15/04 141/1 |
| 6,474,376 B2 * | 11/2002 | Hagano | | B60K 15/04 141/312 |
| 6,502,607 B2 * | 1/2003 | Brown | | B60K 15/04 137/391 |
| 6,681,817 B2 * | 1/2004 | Hagano | | B60K 15/04 141/312 |
| 6,691,750 B1 * | 2/2004 | Foltz | | B60K 15/04 141/348 |
| 7,708,036 B2 * | 5/2010 | Bar | | B60K 15/04 141/350 |
| 7,950,425 B2 * | 5/2011 | Och | | B60K 15/04 141/350 |
| 8,720,721 B2 | 5/2014 | Dutzi et al. | | |
| 8,820,562 B2 * | 9/2014 | Kito | | B29C 45/1657 220/304 |
| 9,434,248 B2 * | 9/2016 | Hagano | | B60K 15/05 |
| 9,487,083 B2 * | 11/2016 | Kito | | B60K 15/04 |
| 2001/0025666 A1 * | 10/2001 | Brown | | B60K 15/04 141/1 |
| 2001/0029994 A1 * | 10/2001 | Brown | | B60K 15/04 141/1 |
| 2002/0074335 A1 * | 6/2002 | Ono | | B60K 15/0406 220/304 |
| 2002/0092581 A1 * | 7/2002 | Hagano | | B60K 15/04 141/348 |
| 2003/0024599 A1 * | 2/2003 | Hagano | | B60K 15/04 141/348 |
| 2003/0075543 A1 * | 4/2003 | Hagano | | B60K 15/0406 220/255 |
| 2005/0155671 A1 * | 7/2005 | McClung | | B60K 15/035 141/350 |
| 2008/0087354 A1 * | 4/2008 | Cisternino | | B60K 15/0406 141/350 |
| 2013/0075395 A1 | 3/2013 | Hagano | | |
| 2014/0084005 A1 * | 3/2014 | Kito | | B29C 45/1657 220/304 |
| 2014/0091095 A1 | 4/2014 | Hagano et al. | | |
| 2014/0319161 A1 * | 10/2014 | Kito | | B60K 15/04 220/820 |
| 2015/0151633 A1 * | 6/2015 | Kito | | B60K 15/04 137/527 |
| 2015/0343898 A1 * | 12/2015 | Kito | | B60K 15/04 220/86.1 |

FOREIGN PATENT DOCUMENTS

| | | |
|---|---|---|
| JP | 2013-071504 A | 4/2013 |
| JP | 2014-069618 A | 4/2014 |

OTHER PUBLICATIONS

Office Action dated Oct. 31, 2017 in the corresponding Chinese Patent Application No. 201510959052.6 (and English translation).

* cited by examiner

FUELING DEVICE

CROSS-REFERENCE TO RELATED APPLICATION

The present application claims priority from Japanese application P2014-263707 filed on Dec. 26, 2014, the content of which is hereby incorporated by reference into this application.

BACKGROUND

1. Field

The invention relates to a fueling device.

2. Description of the Related Art

In a generally known configuration of a fueling device, when a fueling nozzle used for fueling is pressed into the fueling device, a valve element is opened to start fueling from the fueling nozzle (for example, JP 2013-71504A). In this fueling device, a resin cover member that is configured to protect the periphery of the valve element on a fill port side from dust and rainwater is mounted to a filler neck that is configured to form a flow path connecting to a fuel tank on the fill port side. In the process of mounting the cover member to the filler neck, an engagement portion of the cover member is engaged with an engaged portion that is provided in an outer wall on an opening side of the filler neck.

During fueling, an operator for fueling may often keep pressing the fueling nozzle into the fueling device to open the valve element and go away from the location of fueling. In such cases, the fueling nozzle leans on the cover member to apply the mass of the fueling nozzle as a load to the cover member. Carelessly extending the time duration when the fueling nozzle is pressed in is likely to expand and deform the cover member under the load and separate the cover member from the filler neck. Increasing the wall thickness of the cover member can suppress expansion and deformation of the cover member. This, however, also suppresses expansion and deformation of the cover member during mounting of the cover member to the filler neck and thus deteriorates the mounting property of the cover member. Accordingly, increasing the wall thickness of the cover member is not the practical solution. There is accordingly a need to suppress expansion and deformation of the cover member and avoid separation of the cover member from the filler neck, while maintaining the mounting property of the cover member.

SUMMARY

In order to solve at least part of the problems described above, the invention may be implemented by the following aspects.

(1) According to a first aspect of the invention, there is provided a fueling device. The fueling device may comprise a filler neck that is configured to form a fuel flow path and have an engaged portion provided on at least part of an outer circumference thereof a cover member that is configured to have an engagement portion which is to be engaged with the engaged portion and is mounted to the outer circumference of the filler neck on an opening side of the fuel flow path; and a restraint portion that is configured to surround at least one of an engaged area in which the engagement portion of the cover member is engaged with the engaged portion of the filler neck and an adjacent area which is adjacent to the engaged area on a cover member end side and to restrain the cover member to the outer circumference of the filler neck.

In the fueling device of this aspect, the restraint portion is arranged to restrain the cover member to the outer circumference of the filler neck in a flow path downstream area including the engagement portion. Even in the case where a load is applied from a fueling nozzle to the cover member, this configuration suppresses expansion and deformation of the cover member in the flow path downstream area including the engagement portion. Using the restraint portion to suppress expansion and deformation of the cover member eliminates the need to increase the wall thickness of the cover member. This accordingly suppresses deterioration of the mounting property of the cover member due to the increased wall thickness. As a result, the fueling device of this aspect suppresses expansion and deformation of the cover member and avoids separation of the cover member from the filler neck, while maintaining the mounting property of the cover member.

(2) In the fueling device of the above aspect, the cover member may have an extension portion that is extended from the engagement portion toward downstream of the fuel flow path to face the outer circumference of the filler neck, and the restraint portion may be arranged to restraint at least the extension portion of the cover member to the outer circumference of the filler neck. In the fueling device of this aspect, the restraint portion is arranged to restrain the cover member including the extension portion downstream of the engagement portion in the fuel flow path to the outer circumference of the filler neck. Even in the case where a load is applied from the fueling nozzle to the cover member, this configuration suppresses expansion and deformation of the cover member in an area including the extension portion. Using the restraint portion to suppress expansion and deformation of the cover member eliminates the need to increase the wall thickness of the cover member. This accordingly suppresses deterioration of the mounting property of the cover member due to the increased wall thickness. As a result, the fueling device of this aspect suppresses expansion and deformation of the cover member and avoids separation of the cover member from the filler neck, while maintaining the mounting property of the cover member.

(3) In the fueling device of the above aspect, the restraint portion may be arranged to restrain a circumference area of the cover member in which the engagement portion is formed, as well as the extension portion. This configuration more effectively ensures engagement of the engagement portion with the engaged portion and thus enhances the effectiveness of avoiding separation of the cover member from the filler neck.

According to a second aspect of the invention, there is provided another fueling device. The fueling device may comprise a filler neck that is configured to form a fuel flow path; an extension portion that is extended from an outer circumference of the filler neck outward and toward an upstream side of the fuel flow path to form a bottomed recess that is provided with an engaged portion; a cover member that is mounted to the outer circumference of the filler neck on an opening side of the fuel flow path and is configured to have an engagement portion which is to be engaged with the engaged portion, on an end of the cover member which is to be fit in the bottomed recess; and a restraint portion that is provided on the upstream side of the engaged portion of the extension portion and is arranged to restrain the cover member to the outer circumference of the filler neck.

DESCRIPTION OF THE PREFERRED EMBODIMENTS

Figure 1:
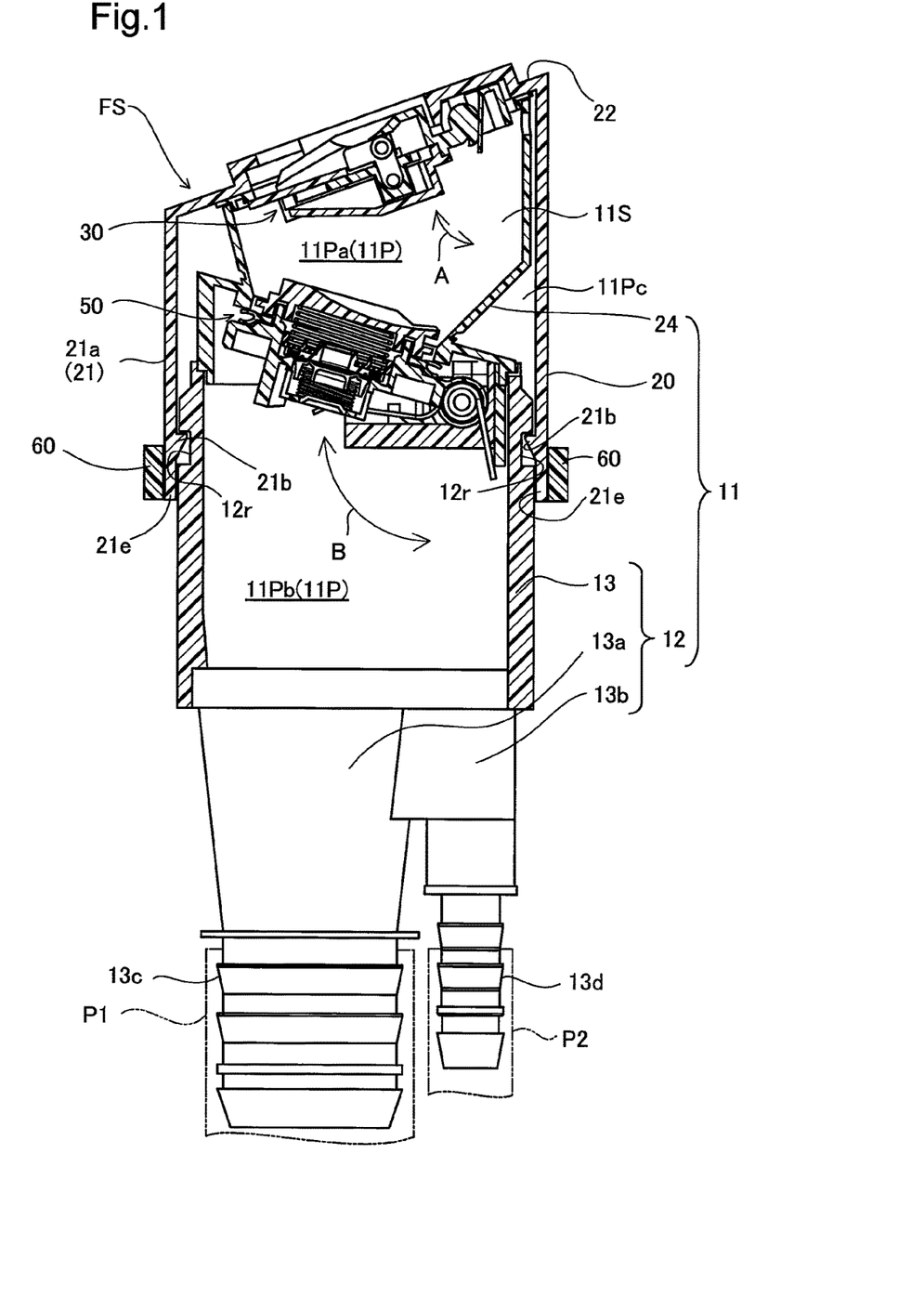
FIG. 1 is a vertical sectional view illustrating the configuration of main part of a fueling device according to one embodiment of the invention.

The following describes some embodiments of the invention with reference to drawings. FIG. 1 is a vertical sectional view illustrating the configuration of main part of a fueling device FS according to one embodiment of the invention. The fueling device FS of the embodiment is generally called capless type without using a fuel cap and is configured to open and close valves placed in a fuel flow path by an external force applied by a fueling nozzle and thereby supply a fuel from the fueling nozzle into a fuel tank. This fueling device FS includes a tank opening-forming member 11 forming a fuel flow path 11P that is to be connected with a fuel tank (not shown), a first flap valve mechanism 30, a second flap valve mechanism 50 and a restraint member 60. The first flap valve mechanism 30 and the second flap valve mechanism 50 respectively have valve elements and are respectively swung by an external force of a fueling nozzle to open and close an insertion flow path 11Pa and a tank-side flow path 11Pb of the fuel flow path 11P as shown by arrows A and B. These valve mechanisms are not directly involved in the subject matter of the invention, so that the description of their configurations is omitted herein.

The tank opening-forming member 11 is a tubular body forming the fuel flow path 11P and includes a filler neck 12 that is connected with the fuel tank via a fuel pipe P1, a cover member 20 that is mounted to an upper end of the filler neck 12, and a flow path-forming member 24 that is fixed above the filler neck 12 and is located in the cover member 20. A space surrounded by the cover member 20 above the filler neck 12 forms an inter-valve chamber 11S, and the flow path-forming member 24 is placed in the inter-valve chamber 11S.

The filler neck 12 includes a cylindrical portion 13, a first connecting portion 13a located below the cylindrical portion 13 and a second connecting portion 13b located below the cylindrical portion 13, which are formed integrally. The filler neck 12 also has an engaged recess 12r on an outer circumferential wall that forms the outer circumference of the cylindrical portion 13. Fir tree structures 13c and 13d serving as pipe stoppers are provided on the respective outer circumferences of the first connecting portion 13a and the second connecting portion 13b. A fuel pipe P1 and a breather pipe P2 that connect with the fuel tank are respectively pressed in the first connecting portion 13a and the second connecting portion 13b to be connected therewith.

The cover member 20 is mounted to an upper opening of the filler neck 12 and includes a cylindrical side wall portion 21 and a first opening-forming member 22. The side wall portion 21 includes a cylindrical side wall body 21a having an inclined upper portion. The first opening-forming member 22 is integrally formed with the inclined upper portion. The first opening-forming member 22 is placed to be inclined to a plane perpendicular to a center axis CA by a first angle θ1. The center axis CA denotes an axis passing through the approximate center of the fuel flow path 11P. In the inter-valve chamber 11S, the first flap valve mechanism 30 is integrated with the first opening-forming member 22 to be swingable as described above. Components required for integration of the first flap valve mechanism 30 are not directly involved in the subject matter of the invention, so that the description of these components is omitted.

The cover member 20 includes an engagement projection 21b and an engagement extension portion 21e on a lower end of the side wall portion 21. The engagement projection 21b of the cover member 20 is engaged with the engaged recess 12r of the filler neck 12, so that the cover member 20 is mounted to the filler neck 12 on the opening side of the fuel flow path 11P. In this mounting state, the engagement extension portion 21e is extended from the engagement projection 21b toward the downstream of the fuel flow path 11P to face the outer circumferential wall of the cylindrical portion 13 of the filler neck 12. In other words, the engagement extension portion 21e is arranged to face the outer circumferential wall of the cylindrical portion 13 in a flow path downstream area of the fuel flow path 11P that is inclusive of and downstream (lower side in the drawing) of the engaged part of the engaged recess 12r with the engagement projection 21b.

The flow path-forming member 24 is placed in the inter-valve chamber 11S and is thermally welded to the opening side of the cylindrical portion 13 of the filler neck 12, so as to part an area of the fuel flow path 11P as the tank-side flow path 11Pb that is the flow path on the fuel tank side. In this parted area as the tank-side flow path 11Pb, the second flap valve mechanism 50 is integrated with the flow path-forming member 24 to be swingable as described above. Components required for integration of the second flap valve mechanism 50 are also not directly involved in the subject matter of the invention, so that the description of these components is omitted.

Figure 2:
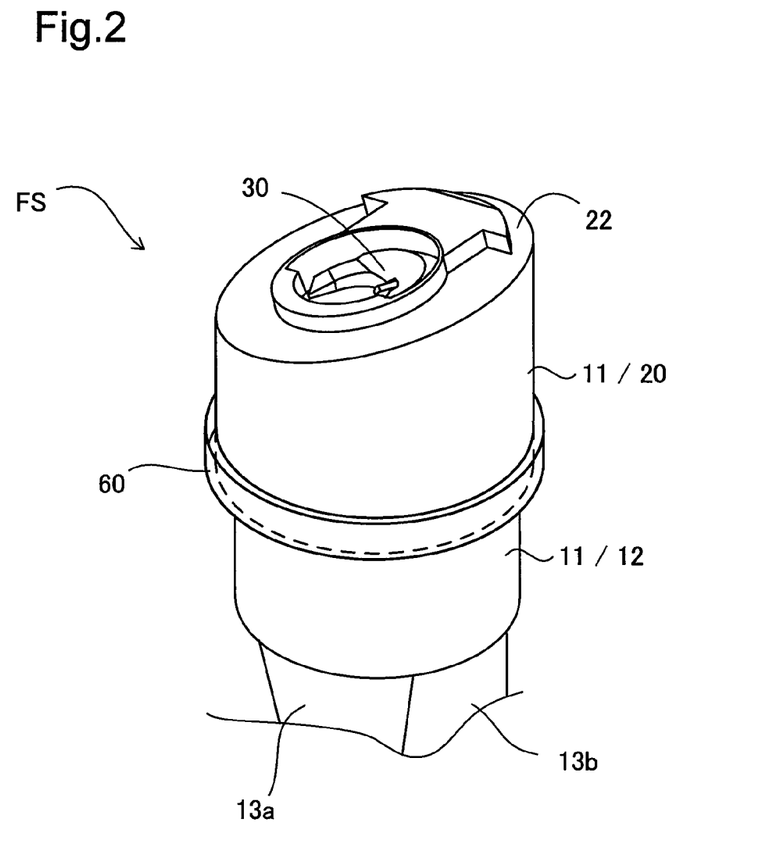
FIG. 2 is a perspective view illustrating main part of the fueling device.

FIG. 2 is a perspective view illustrating main part of the fueling device FS. As illustrated, the restraint member 60 is formed as a ring-shaped belt body and is arranged to surround and restrain the cover member 20 of the tank opening-forming member 11 on its lower end. More specifically, as shown in FIG. 1, the restraint member 60 is configured to restrain the cover member 20 to the outer circumferential wall of the cylindrical portion 13 of the filler neck 12 in the area from the engagement extension portion 21e to the engagement projection 21b of the side wall portion 21 of the cover member 20, in other words, in the flow path downstream area of the fuel flow path 11P that is inclusive of the engaged part of the engaged recess 12r with the engagement projection 21b. The restraint member 60 may be a resin belt body or a metal belt body. The restraint member 60 may be arranged to press the cover member 20 including the engagement extension portion 21e inward against the outer circumferential wall of the cylindrical portion 13 and thereby restrain the filler neck 12 at the engagement extension portion 21e by means of belt winding using a winding mechanism (not shown) or by means of belt overlaying using an overlaying mechanism (not shown).

As described above, in the fueling device FS of this embodiment, the engagement projection 21b of the cover member 20 is engaged with the engaged recess 12r of the filler neck 12, so that the cover member 20 is mounted to the filler neck 12 on the opening side of the fuel flow path 11P. The cover member 20 mounted thereto serves to protect the periphery of the first flap valve mechanism 30 and the second flap valve mechanism 50 from dust and rainwater. Additionally, in the fueling device FS of this embodiment, the cover member 20 including the engagement extension portion 21e downstream of the engagement projection 21b in the fuel flow path 11P is restrained to the outer circumferential wall of the filler neck 12. Even in the case where the fueling nozzle is kept pressed in the fueling device FS to apply a load to the cover member 20, this configuration suppresses expansion and deformation of the cover member 20 in the restrained area including the engagement extension portion 21e. Using the restraint member 60 to suppress expansion and deformation of the cover member 20 eliminates the need to increase the wall thickness of the cover member 20. This accordingly suppresses deterioration of the mounting property due to the increased wall thickness. As a result, the fueling device FS of the embodiment suppresses expansion and deformation of the cover member 20 and avoids separation of the cover member 20 from the filler neck 12 without damaging the mounting property of the cover member 20.

In the fueling device FS of this embodiment, the restraint member 60 is mounted after mounting of the cover member 20. This does not require significant change in shapes of the cover member 20 and the filler neck 12. Accordingly, the configuration of this embodiment is applicable to an existing fueling device to suppress expansion and deformation of a cover member.

Figure 3:
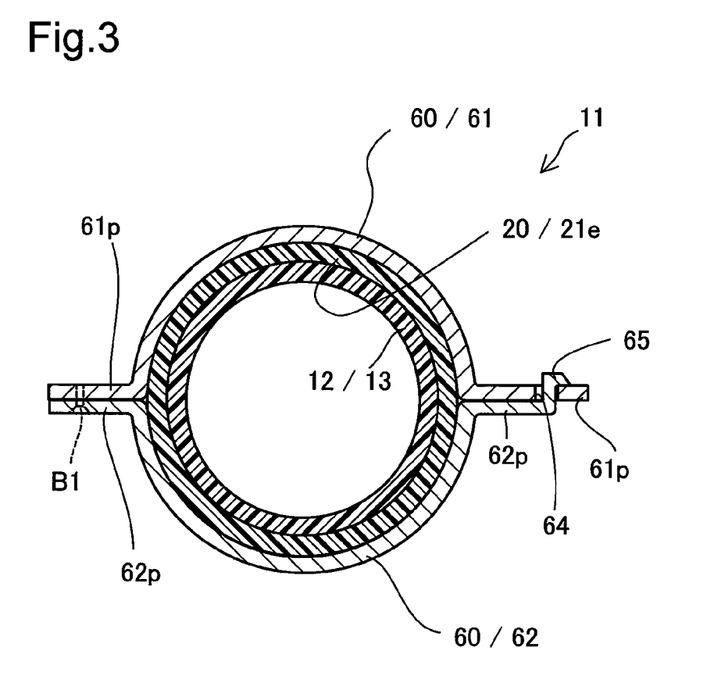
FIG. 3 is a cross sectional view illustrating the configuration of a restraint member in a fueling device according to a second embodiment.

The following describes other embodiments. FIG. 3 is a cross sectional view illustrating the configuration of a restraint member 60 in a fueling device FS according to a second embodiment. This embodiment is characterized by the two-part configuration of the restraint member 60. As illustrated, the restraint member 60 includes a first restraint member 61 and a second restraint member 62. The first restraint member 61 and the second restraint member 62 respectively have circular arc portions in arc shape to surround the respective semicircular areas of the filler neck 12 (or more specifically, the cylindrical portion 13) and have flat plate portions 61p and 62p extended from the respective ends of the circular arc portions. The first restraint member 61 has an engagement hole 64 formed in one flat plate portion 61p. The second restraint member 62 has an engagement piece 65 provided in one flat plate portion 62p to be fit in and engaged with the engagement hole 64. In the state that the engagement piece 65 is fit in and engaged with the engagement hole 64, the other flat plate portion 62p of the second restraint member 62 is laid on the other flat plate portion 61p of the first restraint member 61. In this state, the first and the second restraint members 61 and 62 are fixed to each other by means of a bolt B1 such as a flat head screw. In this fixed state, the restraint member 60 consisting of the first restraint member 61 and the second restraint member 62 restrains the cover member 20 to the outer circumferential wall of the cylindrical portion 13 of the filler neck 12 in the area from the engagement extension portion 21e to the engagement projection 21b of the side wall portion 21 of the cover member 20 (shown in FIG. 2).

The fueling device FS of the second embodiment also suppresses expansion and deformation of the cover member 20 and avoids separation of the cover member 20 from the filler neck 12 without damaging the mounting property of the cover member 20. The configuration of this embodiment is also applicable to an existing fueling device to suppress expansion and deformation of a cover member. The first restraint member 61 and the second restraint member 62 of the second embodiment may be resin molded products or may be press molded products formed by pressing a metal plate. The first restraint member 61 and the second restraint member 62 of the restraint member 60 may be fixed to each other by means of bolts or the like on both the flat plate portions 61p and 62p, instead of using the engagement hole 64 and the engagement piece 65. The first restraint member 61 and the second restraint member 62 may be integrated with each other by means of hinges or elastically deformable fittings, before being mounted to restrain the cover member 20. According to another modification, the entire restraint member 60 shown in FIG. 3 may be formed from an elastically deformable metal or resin material such as a leaf spring. This restraint member 60 may be mounted to the cover member 20 by separating the other flat plate portions 61p and 62p from each other and subsequently fastened by means of the bolt B1.

Figure 4:
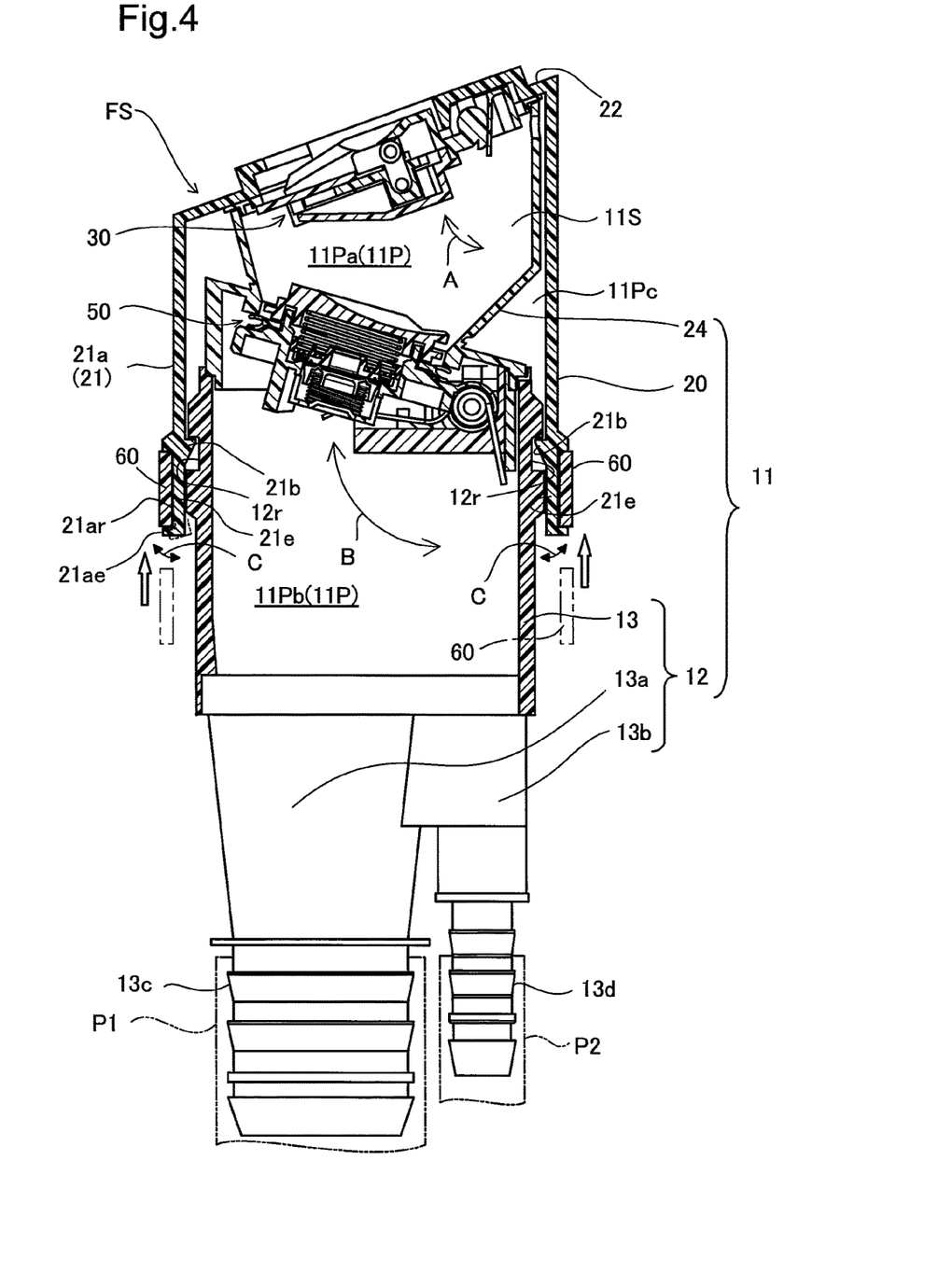
FIG. 4 is a vertical sectional view illustrating the configuration of main part of a fueling device according to a third embodiment.

FIG. 4 is a vertical sectional view illustrating the configuration of main part of a fueling device FS according to a third embodiment. The fueling device FS of the third embodiment is characterized by the configuration of a restraint member 60 that is provided as a ring-shaped one-part member and is mounted to a cover member 20.

As illustrated, the cover member 20 includes a restraint member mounting recess 21ar on a lower end of a side wall body 21a of the side wall portion 21. The restraint member 60 provided as the ring-shaped one-part member is mounted to this restraint member mounting recess 21ar. The side wall body 21a is formed flexible to allow for bending of the restraint member mounting recess 21ar as shown by an arrow C in FIG. 4. The restraint member 60 is mounted to the restraint member mounting recess 21ar in the state that the restraint member mounting recess 21ar is bent such that a lower end wall 21ae of the restraint member mounting recess 21ar comes near to the outer circumferential wall of the cylindrical portion 13. The mounted restraint member 60 is received by an engagement extension portion 21e to restrain the cover member 20 to the outer circumferential wall of the cylindrical portion 13 of the filler neck 12 in the area from the engagement extension portion 21e to the engagement projection 21b of the side wall portion 21 of the cover member 20.

The fueling device FS of the third embodiment also suppresses expansion and deformation of the cover member 20 and avoids separation of the cover member 20 from the filler neck 12 without damaging the mounting property of the cover member 20. The restraint member 60 of the third embodiment may be a ring-shaped resin molded product or may be a ring-shaped molded product formed by pressing a metal plate and welding ends of the pressed metal plate. The restraint member mounting recess 21ar and the lower end wall 21ae of the third embodiment may be formed along the entire lower end opening of the side wall portion 21 or may be formed intermittently at adequate intervals, for example, at four equal intervals or at six equal intervals, along this lower end opening. According to another modification, an upper end wall opposite to the lower end wall 21ae may be formed flexible. This enables the restraint member 60 to be mounted to the restraint member mounting recess 21ar from the first opening-forming member 22-side that is the upper end side of the cover member 20.

Figure 5:
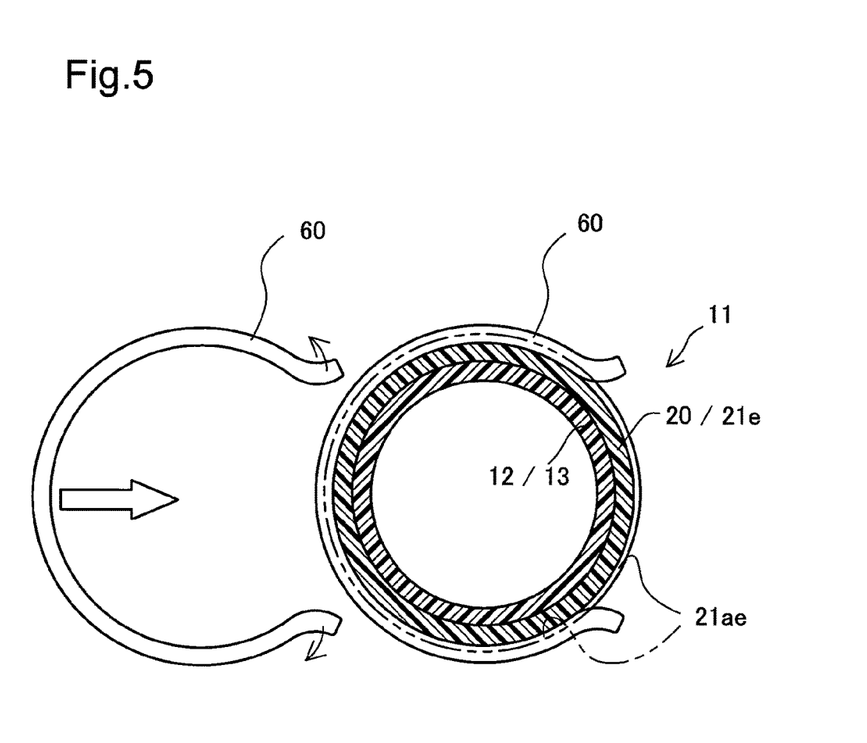
FIG. 5 is a cross sectional view illustrating the configuration of a restraint member in the configuration of main part of a fueling device according to a fourth embodiment.

FIG. 5 is a cross sectional view illustrating the configuration of a restraint member 60 in the configuration of main part of a fueling device FS according to a fourth embodiment. This embodiment is characterized by the configuration of the restraint member 60 that is provided as a one-part member and is formed in an arc shape having open ends. This restraint member 60 is expandable on the open ends side. In the process of mounting the restraint member 60 to the restraint member mounting recess 21ar shown in FIG. 4, the open ends side of the restraint member 60 is expanded to allow for insertion of the cover member 20 and is subsequently returned to the original state after the insertion. The restraint member 60 accordingly restrains the cover member 20 to the outer circumferential wall of the cylindrical portion 13 of the filler neck 12 in the restraint member mounting recess 21ar of the cover member 20 or in other words, in the area from the engagement extension portion 21e to the engagement projection 21b of the side wall portion 21 of the cover member 20.

This restraint member 60 does not restrain the cover member 20 to the outer circumferential wall of the cylindrical portion 13 of the filler neck 12 between the opposed open ends. A load is applied by the fueling nozzle to substantially the same location on the cover member 20. The cover member 20 is thus expanded and deformed under the load in substantially the same location. The restraint member 60 should thus be mounted to restrain the cover member 20 to the outer circumferential wall of the cylindrical portion 13 of the filler neck 12, such that the arc shape area of the restraint member 60 shown in FIG. 5 includes the location of the cover member 20 that receives the load and is expanded and deformed.

The fueling device FS of the fourth embodiment also suppresses expansion and deformation of the cover member 20 and avoids separation of the cover member 20 from the filler neck 12 without damaging the mounting property of the cover member 20. The restraint member 60 of the fourth embodiment may be a resin molded product or a press molded product formed by pressing a metal plate. The restraint member 60 should be formed to have the inner circumferential shape corresponding to the outer circumferential shape of the cover member 20 or more specifically corresponding to the shape of at least one half the outer circumference of the cover member 20.

Figure 6:
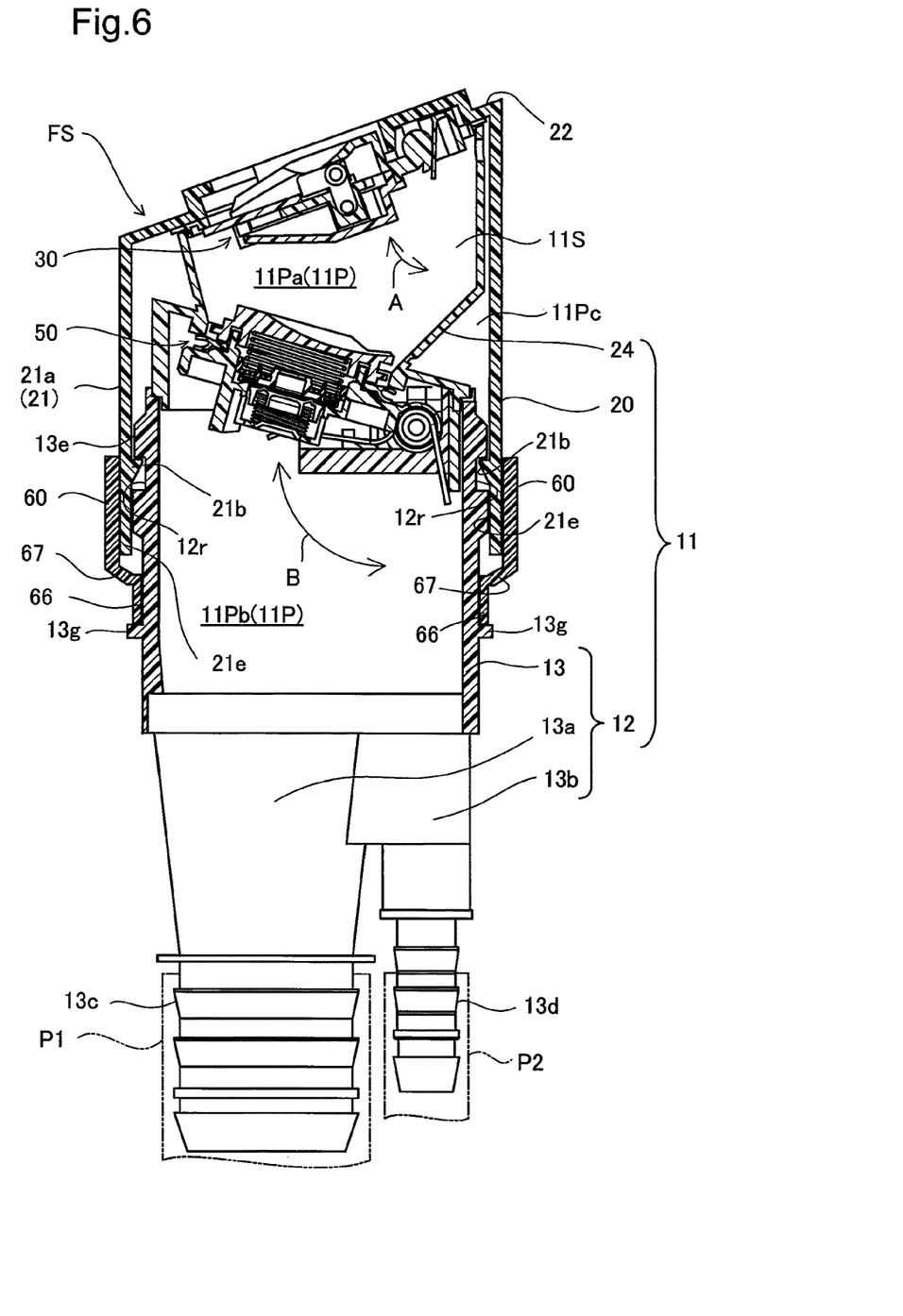
FIG. 6 is a vertical sectional view illustrating the configuration of main part of a fueling device according to a fifth embodiment.

FIG. 6 is a vertical sectional view illustrating the configuration of main part of a fueling device FS according to a fifth embodiment. The fueling device FS of the fifth embodiment is characterized by the configuration of a restraint member 60 that is mounted to a cylindrical portion 13 of a filler neck 12.

As illustrated, the filler neck 12 includes a ring-shaped projection 13g protruded from the outer circumferential wall at a lower end of the cylindrical portion 13. The restraint member 60 is integrated with a surrounding portion 66 configured to surround the cylindrical portion 13 by means of a bridge 67 and is supported by the ring-shaped projection 13g. The restraint member 60 is configured as a two-part member of the first restraint member 61 and the second restraint member 62 as described above in FIG. 3. By mounting the two-part member as described above in FIG. 3, the restraint member 60 presses the area of the cover member 20 in which the engagement projection 21b is formed, as well as the engagement extension portion 21e, against the outer circumferential wall of the filler neck 12. As a result, the restraint member 60 restrains the cover member 20 to the outer circumferential wall of the filler neck 12 in the area including the engagement projection 21b and the engagement extension portion 21e.

The fueling device FS of the fifth embodiment also suppresses expansion and deformation of the cover member 20 and avoids separation of the cover member 20 from the filler neck 12 without damaging the mounting property of the cover member 20. The restraint member 60 of the fifth embodiment may be a resin molded product or a press molded product formed by pressing a metal plate.

In the fueling device FS of the fifth embodiment, the restraint member 60 is arranged to press the area of the cover member 20 in which the engagement projection 21b is formed, as well as the engagement extension portion 21e, against the outer circumferential wall of the filler neck 12. Accordingly the configuration of the fueling device FS of the fifth embodiment more effectively ensures engagement of the engagement projection 21b of the cover member 20 with the engaged recess 12r of the filler neck 12 and thus more effectively avoids separation of the cover member 20 from the filler neck 12. The restraint member 60 in the fueling device FS of the fifth embodiment may also be configured as a one-part member, as described above in FIG. 5.

Figure 7:
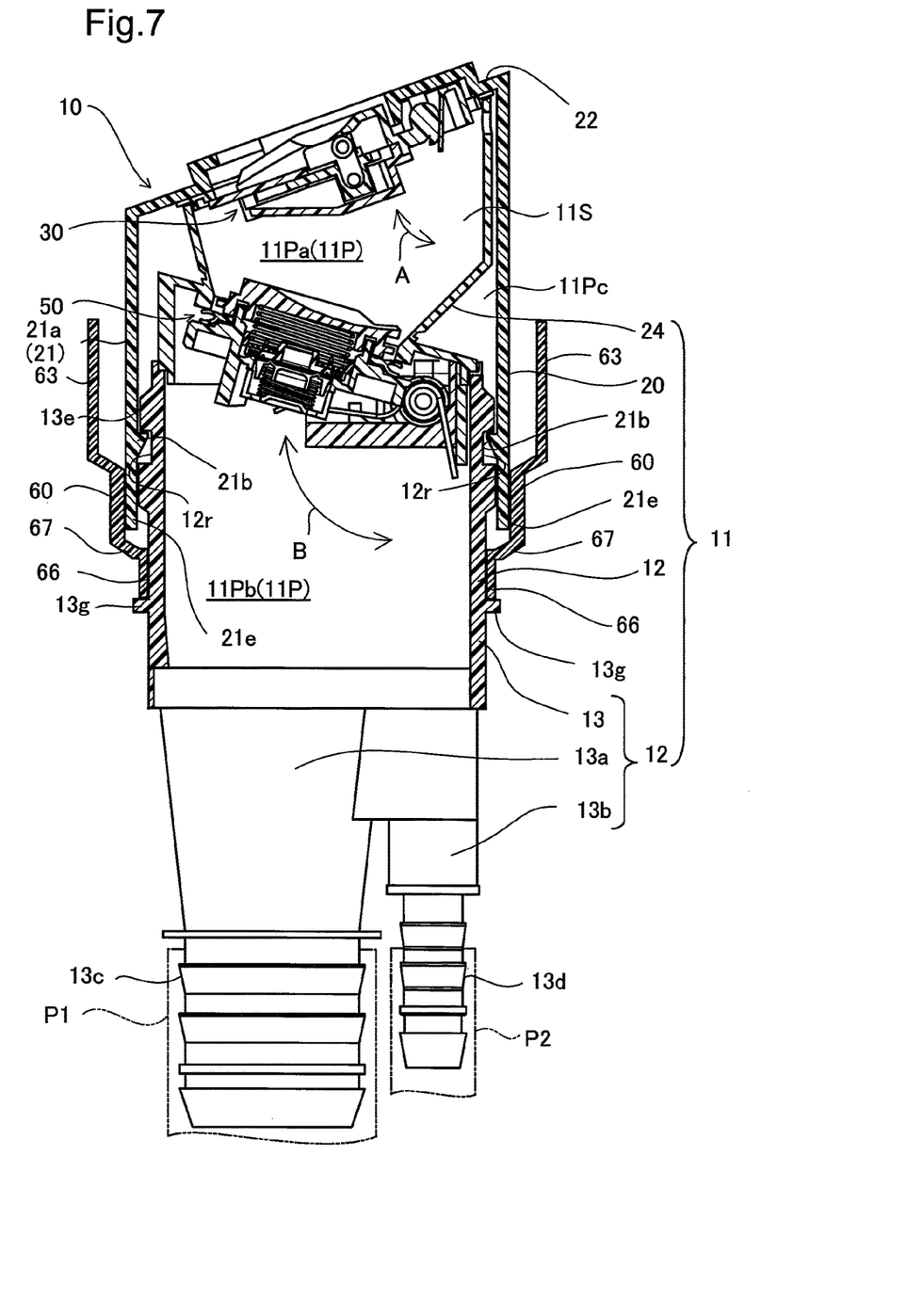
FIG. 7 is a vertical sectional view illustrating the configuration of main part of a fueling device according to a sixth embodiment.

FIG. 7 is a vertical sectional view illustrating the configuration of main part of a fueling device FS according to a sixth embodiment. Like the fifth embodiment, the fusing device FS of the sixth embodiment is characterized by the configuration of a restraint member 60 that is mounted to the cylindrical portion 13 of the filler neck 12 and protects the periphery of the second flap valve mechanism 50 integrated with the cover member 20.

As illustrated, the restraint member 60 is integrated with a surrounding portion 66 configured to surround the cylindrical portion 13 by means of a bridge 67 and is supported by a ring-shaped projection 13g of the filler neck 12. The restraint member 60 has an upper end extended to the periphery of the second flap valve mechanism 50 integrated with the cover member 20. This configuration suppresses expansion and deformation of the cover member 20 and avoids separation of the cover member 20 from the filler neck 12, while protecting the second flap valve mechanism 50. The restraint member 60 of the sixth embodiment may be configured as a two-part member, as described above in FIG. 3, and the respective parts may be provided as resin molded products or press molded products formed by pressing a metal plate. In the configuration of the restraint member 60 as a metal press molded product, the first constraint member 61 may be heated and is thermally welded to the outer circumferential wall of the cylindrical portion 13 of the filler neck 12. In the fifth and the sixth embodiments, the ring-shaped projection 13g may not be necessarily formed in a complete circle but may be formed in a partly omitted circle, as long as the ring-shaped projection 13g supports the restraint member 60. According to a modification, plurality of projections may be provided at equal intervals along the outer circumference of the filler neck 12 or may be provided at adequate positions along the outer circumference of the filer neck 12. The restraint member 60 in the fueling device FS of the sixth embodiment may also be configured as a one-part member, as described above in FIG. 5.

Figure 8:
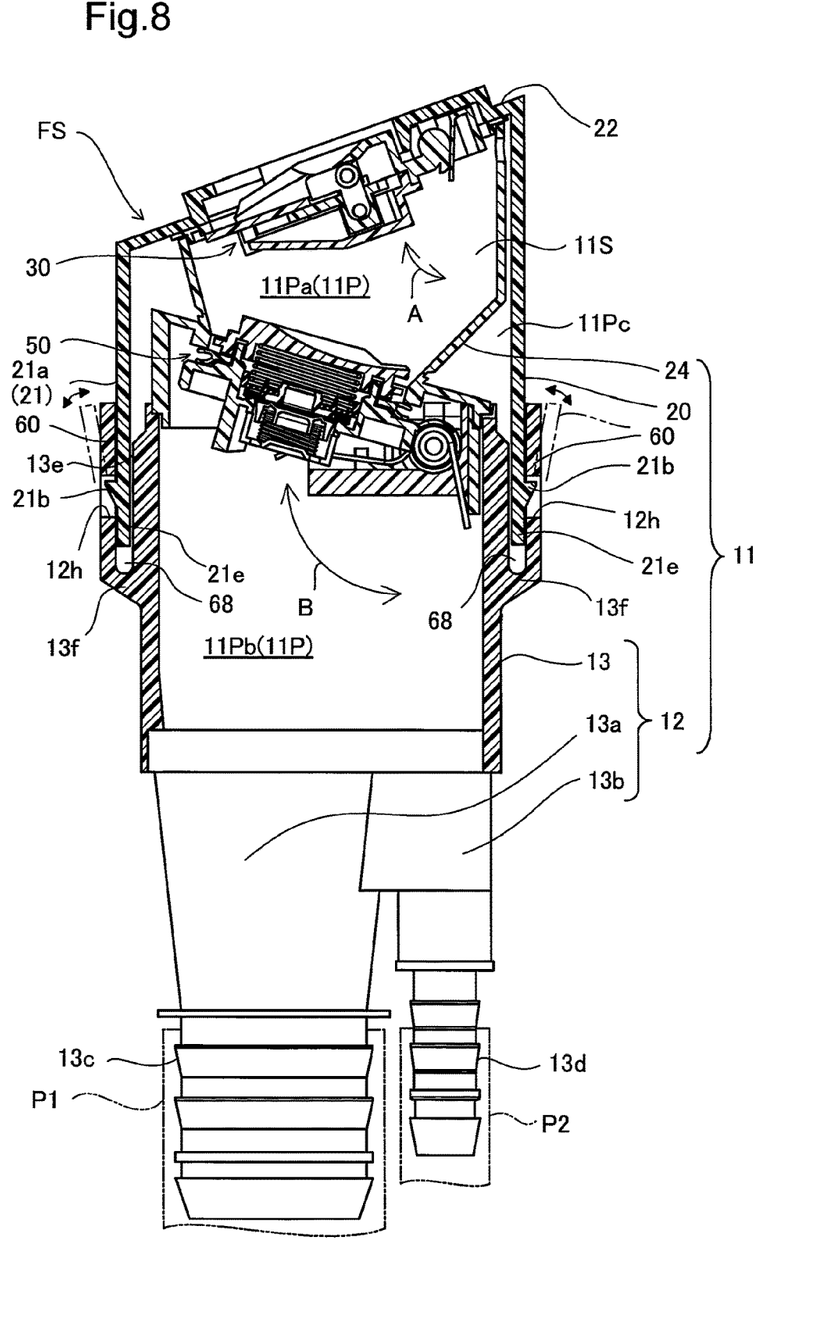
FIG. 8 is a vertical sectional view illustrating the configuration of main part of a fueling device according to a seventh embodiment.

FIG. 8 is a vertical sectional view illustrating the configuration of main part of a fueling device FS according to a seventh embodiment. The fueling device FS of the seventh embodiment is characterized by the configuration of a restraint member 60 that is extended from a cylindrical portion 13.

As illustrated, a filler neck 12 includes a bridge 13f that is extended from the outer circumferential wall of the cylindrical portion 13. The restraint member 60 is extended from the upper end of the bridge 13f. The restraint member 60 has an engaged hole 12h which an engagement projection 21b of the cover member 20 is fit in and engaged with. As shown by an arrow in FIG. 8, the restraint member 60 is formed flexible to be expanded about the bridge 13f as the base point. The restraint member 60 also has a bottomed recess 68 formed around the outer peripheral wall of the cylindrical portion 13 on the bridge 13f-side. In the process of mounting the cover member 20 to the filler neck 12 of this configuration, the cover member 20 is laid over the filler neck 12 in the state that the restraint member 60 is bent to be away from the outer circumferential wall of the cylindrical portion 13. When the engagement projection 21b of the cover member 20 is fit in and engaged with the engaged hole 12h of the restraint member 60, the restraint member 60 is elastically bounced to the outer circumferential wall side of the cover member 20 and causes the engagement extension portion of the restraint member 60 to enter the bottomed recess 68. This completes mounting of the cover member 20. In the mounting state of the cover member 20, the restraint member 60 restrains the cover member 20 to the outer peripheral wall of the filler neck 12 in the area including the engagement projection 21b and the engagement extension portion 21e.

The fueling device FS of the seventh embodiment also suppresses expansion and deformation of the cover member 20 and avoids separation of the cover member 20 from the filler neck 12 without damaging the mounting property of the cover member 20. In the fueling device FS of the seventh embodiment, the restraint member 60 is arranged to press the area of the cover member 20 in which the engagement projection 21b is formed, as well as the engagement extension portion 21e, against the outer circumferential wall of the filler neck 12. This configuration more effectively ensures engagement of the engagement projection 21b of the cover member 20 with the engaged recess 12r of the filler neck 12 and thus more effectively avoids separation of the cover member 20 from the filler neck 12. Additionally, unlike the respective embodiments described above, in the fueling device FS of the seventh embodiment, there is no need to mount the restraint member 60 to the filler neck 12 after mounting of the cover member 20, but there is only a requirement to lay the cover member 20 over the filler neck 12. Accordingly the configuration of the fueling device FS of the seventh embodiment simplifies the operation required for restraining the cover member 20. The engaged hole 12h serving as the engaged portion may not be necessarily formed as a hole but may be formed as a recess which the engagement projection 21b is engaged with. The engaged hole 12h may be replaced by an engagement convex which the engagement projection 21b first runs on and then goes through to be engaged with in the process of mounting.

Figure 9:
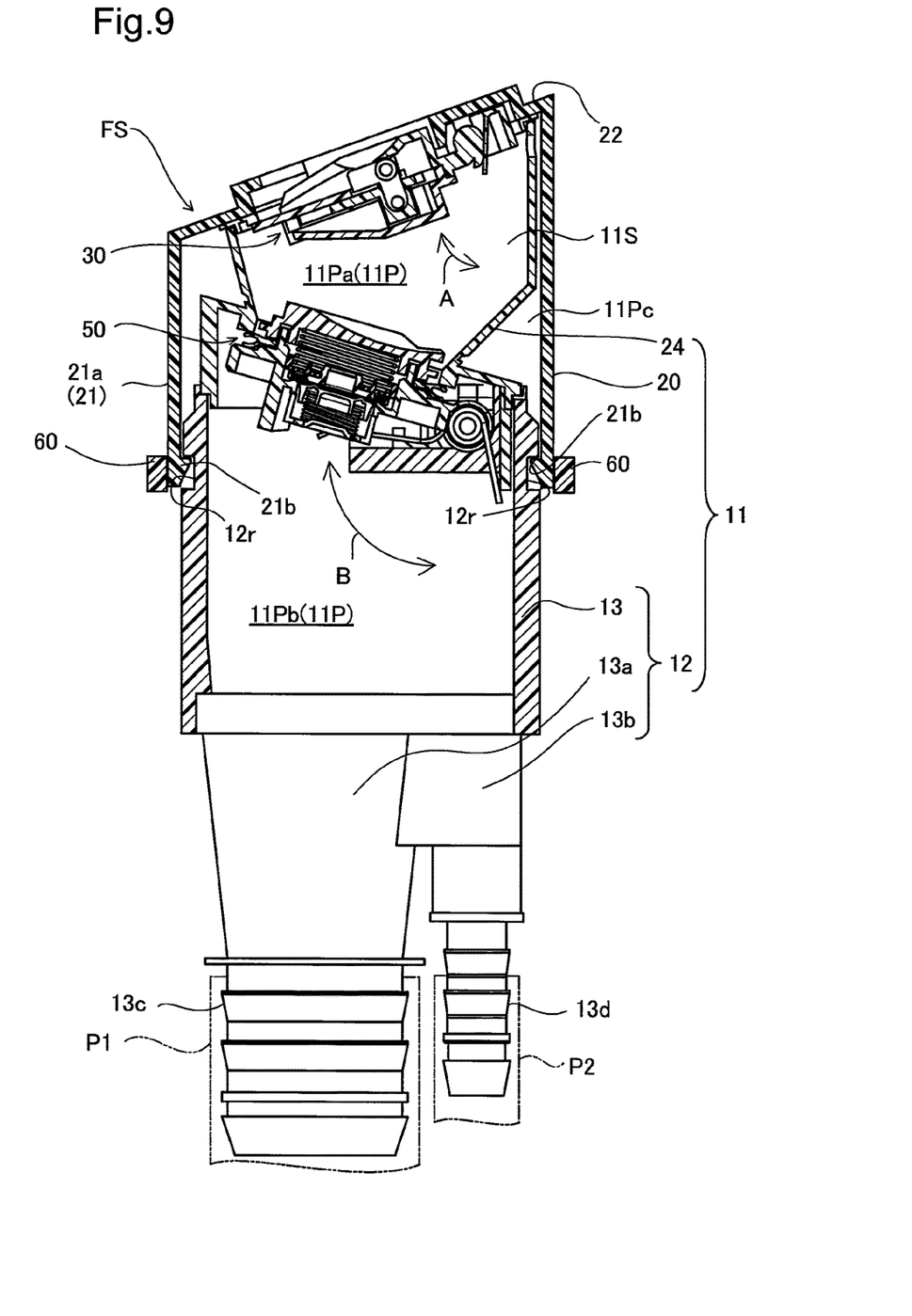
FIG. 9 is a vertical sectional view illustrating the configuration of main part of a fueling device according to an eighth embodiment.
Figure 10:
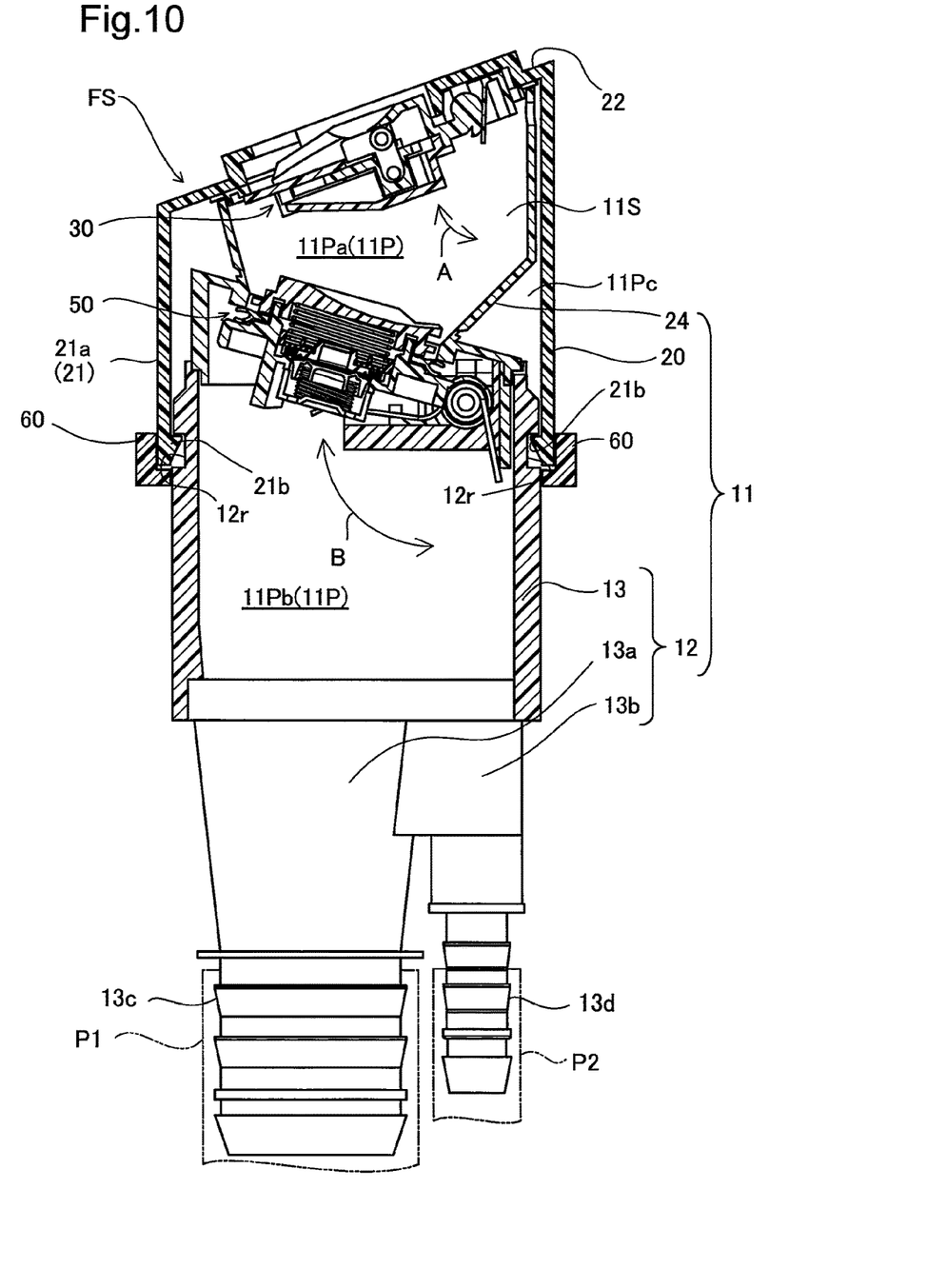
FIG. 10 is a vertical sectional view illustrating the configuration of main part of a fueling device according to a ninth embodiment.

FIG. 9 is a vertical sectional view illustrating the configuration of main part of a fueling device FS according to an eighth embodiment. FIG. 10 is a vertical sectional view illustrating the configuration of main part of a fueling device FS according to a ninth embodiment. The fueling devices FS of the eighth embodiment and the ninth embodiment are characterized by the configurations of a restraint member 60 to restrain the engaged part of an engagement projection 21b and an engaged recess 12r to the cylindrical portion 13 of the filler neck 12.

In each of these embodiments, the cover member 20 has an engagement projection 21b like the respective embodiments described above but does not have an engagement extension portion 21e on its downstream side. The restraint member 60 is arranged to directly surround and restrain the engagement projection 21b of the cover member 20 that is engaged with the engaged recess 12r of the filler neck 12, from the outer circumferential wall side of the cover member 20 and maintains the engagement of the engaged recess 12r with the engagement projection 21b. This configuration suppresses expansion and deformation of the cover member 20 and avoids separation of the cover member 20 from the filler neck 12. In these embodiments, the restraint member 60 may be configured as a two-part member, as described above in FIG. 3, and the respective parts may be provided as resin molded products or press molded products formed by pressing a metal plate. The restraint member 60 may otherwise be configured as a one-part member, as described above in FIG. 5.

The invention is not limited to the embodiments described above but may be implemented by a diversity of other configurations without departing from the scope of the invention. For example, the technical features of the embodiments corresponding to the technical features of the respective aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A fueling device, comprising:
   a filler neck that is configured to form a fuel flow path, wherein the filler neck has an engaged recess provided on at least part of an outer circumference thereof;
   a cover member that has an engagement projection and an extension portion, wherein
      the engagement projection is engaged with a side wall of the engaged recess and is mounted to the outer circumference of the filler neck on an opening side of the fuel flow path,
      the extension portion is extended from the engagement portion in a downstream direction of the fuel flow path to face the outer circumference of the filler neck,
      the extension portion is closer to an end of the cover member than the engagement projection, and
      a thickness of the extension portion in a radial direction of the filler neck is the same as that of the cover member; and
   a restraint member that is configured to surround at least the extension portion, wherein the restraint member is arranged to restrain at least the extension portion from an outside of the cover member at a location that is further downstream in the direction of the fuel flow path than the side wall of the engaged recess, and the restraint member presses the cover member against the filler neck to restrain the cover member with respect to the filler neck.

2. The fueling device according to claim 1, wherein the restraint member is arranged to restrain a circumferential wall area of the cover member in which the engagement projection is formed and to restrain the extension portion.

3. The fueling device according to claim 1, wherein the engaged recess is an inner recess, and the cover member has an outer recess that is formed on at least part of the outer circumference to receive the restrain member therein.

4. The fueling device according to claim 1, wherein
the filler neck has a projection that is provided on at least part of the outer circumference of the filler neck downstream of the engaged recess and is protruded outward, and
at least part of the restraint member is brought into contact with and supported by the projection in a state such that the restraint member restrains the cover member to the outer circumference of the filler neck.

5. The fueling device according to claim 1, wherein the restraint member comprises a first restraint member and a second restraint member that are separable from each other.

6. The fueling deice according to claim 1, wherein
the restraint member is provided from an elastic member formed in a partly open arc shape, and
the elastic member has an inner circumferential shape corresponding to shape of at least one half of the outer circumference of the cover member surrounded by the restraint member.

7. The fueling device according to claim 1, wherein
the engaged recess is a bottomed recess that is extended from the outer circumference of the filler neck outward and toward an upstream side of the fuel flow path, and
the engagement projection is provided on an end of the cover member and is to be fitted in the bottomed recess.

8. The fueling device according to claim 7, wherein the side wall of the engaged recess is a side wall of the bottomed recess.

9. The fueling device according to claim 1, wherein the side wall of the engaged recess has an engaged surface that faces in the downstream direction of the fuel flow path, and the engagement projection has an engagement surface that faces in an upstream direction of the fuel flow path and is configured to engage the engaged surface of the side wall when the cover is mounted on the filler neck.

10. The fueling device according to claim 1, wherein the engaged recess has an opening that faces in a radially outward direction of the filler neck.

11. The fueling device according to claim 1, wherein the engagement projection projects from an inner surface of the cover member in a radially inward direction of the cover member to engage with the side wall of the engaged recess.

12. The fueling device according to claim 1, wherein the restraint member is annular, and an inner surface of the restraint member directly contacts an outer surface of the cover member.

13. The fueling device according to claim 1, wherein the cover member is a single, unitary part.

14. The fueling device according to claim 1, wherein the extension portion extends beyond the engaged recess in the downstream direction of the fuel flow path.

15. The fueling device according to claim 1, wherein the restraint member surrounds the extension portion and a section of the cover member in which the engagement projection is formed, from an outside of the cover member, at a location that is further upstream in the direction of the fuel flow path than the extension portion, to press the cover member against the filler neck to restrain the cover member with respect to the filler neck.

* * * * *